J. J. SHELTON.
Rotary Churn.

No. 165,033.

Patented June 29, 1875.

WITNESSES—

INVENTOR—

UNITED STATES PATENT OFFICE.

JOHN J. SHELTON, OF WASHINGTON, MISSOURI.

IMPROVEMENT IN ROTARY CHURNS.

Specification forming part of Letters Patent No. 165,033, dated June 29, 1875; application filed June 22, 1875.

*To all whom it may concern:*

Be it known that I, JOHN J. SHELTON, of Washington, Missouri, have invented an Improvement in Churns, of which the following is a specification:

The invention herewith described relates to that class of churns which are suspended on axles at the diagonal corners, and are zigzag in shape, as will be hereinafter described.

Figure 1:
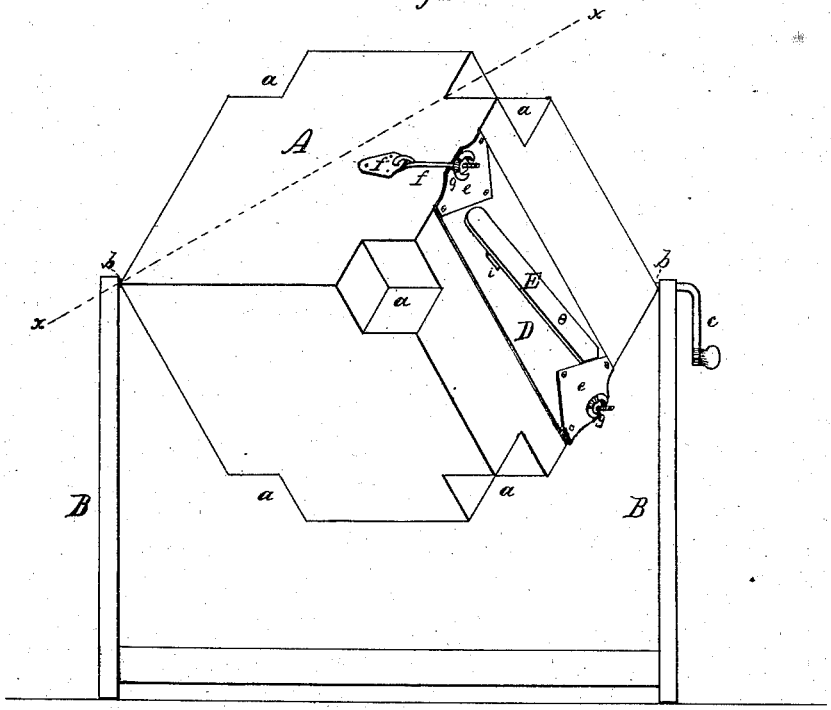
Figure 2:
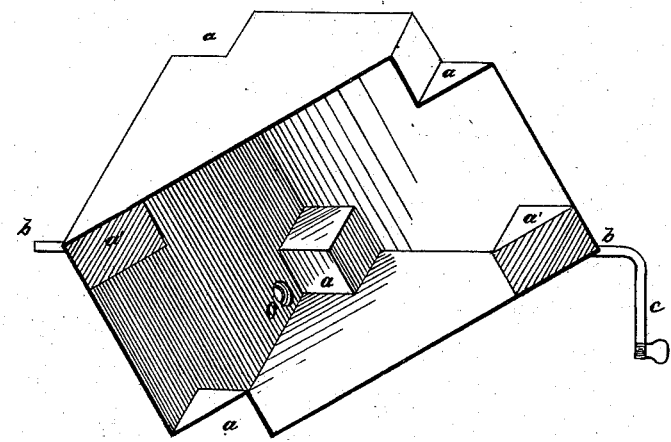

Figure 1 of the drawing represents the churn complete, as hung on any frames or bearings sufficient to support the same. Fig. 2 is a sectional view taken on dotted line $x\ x$ in Fig. 1.

A is the body or box of the churn—a hollow cube—having recesses $a\ a\ a\ a\ a$ at six of its corners, the walls of said recesses projecting into the interior of the box. The box A is hung on journals $b\ b$, upon bearings in standards B B. The journals $b\ b$ are arranged at diagonally-opposite corners of the box, and at these corners there are no recesses, but instead thereof blocks $a'\ a'$ are arranged snugly in the corners of the box, for the purpose of strengthening the journal-supports. A crank, $c$, by means of which the churn is rotated, is attached to one of the journals. D is the door or lid. $e\ e$ are ears attached to each end of said lid and projecting slightly beyond the sides of the box. About the middle of the projecting edges of these ears are open slots, through which pass rods $f$, attached to ears $f'$. The outer ends of these rods have screw-threads cut thereon, over which pass thumb-nuts $g\ g$. E is an elastic bar, firmly attached to the lid at $h$, but free at its opposite end. To the under side of this bar is attached a rubber pad, $i$, which the elasticity of the bar presses upon an orifice in the lid. O is an opening in one side of the box, said opening being ordinarily closed by a screw-cap, which may be replaced by a perforated screw-cap, as hereinafter explained. The box with eight (8) inverted corners, when revolved by a crank, produces a zigzag current or motion which comes directly in contact with the eight inverted corners, producing more friction than other churns, giving a like motion to all the milk, at the same time producing more butter, or all the butter contained in the globules, by said friction or agitation. The lid is composed of a solid board a proportionable width, to admit of milk and butter passing freely. The fastenings across the ends to insert rods from side of churn in slots, with screws to tighten down to prevent leaking; also, rabbet on lower side of lid with rubber gasket fastened on to meet the rabbet on balance of top of churn; also, on lid a safety or escape valve to allow the air to pass out while churning, as friction creates heat, and heat expansion. Thus through the valve the heated air escapes, and admits fresh air, which is said, in circulating through milk in churning, produces the most and best of butter, which principle I claim in my churn. To illustrate: fill the churn half full of milk; close same up air-tight, the other half or vacuum being filled with air; then by revolving the churn the circulation begins, which is complete, and when it expands is let out through valve and fresh air admitted. A nipple is placed on corner of churn to let out the milk, retaining the butter which is worked in the churn by simply revolving the churn slowly, while the butter, falling from corner to corner, works all the milk out and gives out pure butter free from buttermilk. If the butter is slow to collect put on nipple that is perforated, and strain the milk from the butter, then revolve the churn and it will force a collection of the butter.

What I claim, and desire Letters Patent for, is—

A rectangular churn body rotating upon angles situated at two diagonally-opposite corners, these corners being re-enforced by blocks set in, inside the churn body, the remaining corners being re-entrant, as and for the purpose specified.

JOHN J. SHELTON.

Witnesses:
H. H. WESNAGE,
JAMES BOURAN.